(No Model.)

M. W. DEWEY.
METHOD OF ELECTRICALLY HEATING BARS, &c., FOR WELDING AND WORKING PURPOSES.

No. 436,519. Patented Sept. 16, 1890.

WITNESSES:
J. J. Laass.
C. L. Bendixon.

INVENTOR,
Mark W. Dewey,
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRICALLY HEATING BARS, &c., FOR WELDING AND WORKING PURPOSES.

SPECIFICATION forming part of Letters Patent No. 436,519, dated September 16, 1890.

Application filed June 9, 1890. Serial No. 354,747. (No model.)

*To all whom it may concern:*

Be it known that I, MARK W. DEWEY, of Syracuse, in the county of Onondaga, in the State of New York, have invented new and useful Improvements in the Method of Electrically Heating Bars, &c., for Welding and Working Purposes, (Case No. 61,) of which the following, taken in connection with the accompanying drawings, is a full, clear, and exact description.

My present invention consists of an improved method for electrically heating bars and blanks for welding and working purposes. Said bars and blanks may be of electric conducting or non-conducting materials, and the working operations may be soldering, brazing, bending, cementing, or any other desired operation.

Some of the advantages of my method are, that a weaker current may be employed, the same strength of current may be used for work of various sizes, blanks of various and peculiar shapes can be worked with one and the same apparatus, many articles can be heated at the same time, large bars or blanks may be quickly heated although the current used may be weak on account of the great amount of heat that may be stored before the work is subjected, and an expert operator is not required.

Figure 1:
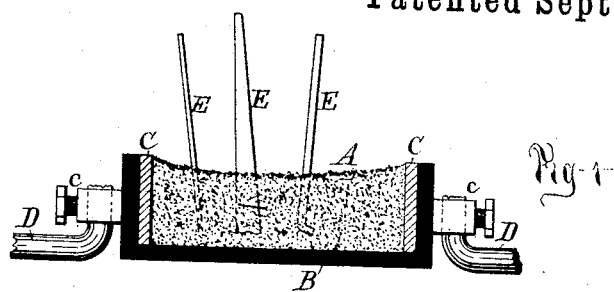
Figure 2:
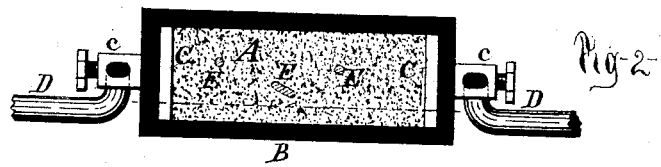
Figure 3:
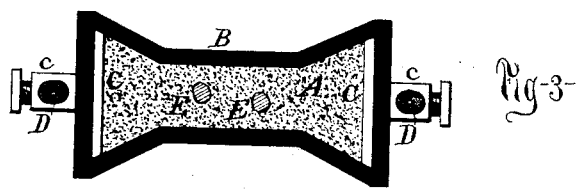
Figure 4:
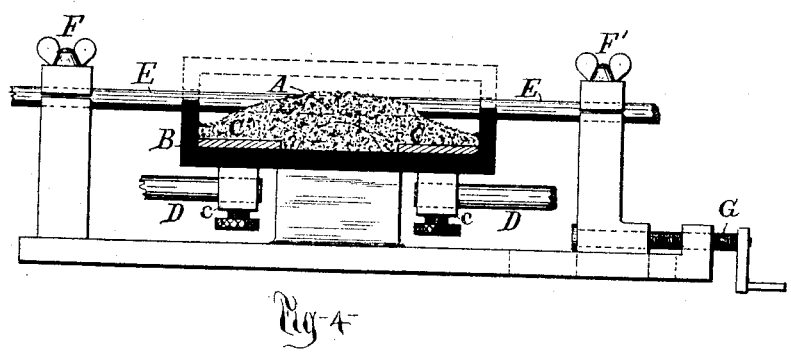

In the accompanying drawings, Figures 1 and 2 are sectional and plan views of apparatus for practicing my invention. Fig. 3 is a slight modification of Fig. 2, and Fig. 4 shows an apparatus adapted for welding and working purposes.

Referring specifically to the drawings, A represents a yielding bed of suitable conducting or semi-conducting material, as powdered or granulated carbon, coal, or metal, or metal mixed with carbon or other semi or non conducting material, as fire-brick, sand, or pumice-stone, to obtain the resistance required. The said bed is preferably supported in a box B of non-conducting material, as fire-brick or asbestos. Within and at each end of the box and facing each other are conducting-plates C C, of metal or other material, which form the terminals of an electric circuit and between which the yielding bed is located. Extending from the plates C C and through the brick are binding-posts c c, to which the electric conductors D D leading from a suitable source of electricity are connected.

E E E indicate the bars or blanks of various shapes and sizes, with their ends embedded in the yielding material to be heated preparatory to being worked or treated, as desired.

In order to prevent the plates C C from becoming highly heated, the yielding bed or resisting material is so formed as to be of higher conductivity where it is in contact with the plates, or its cross-section at the plates is larger than its cross-section in the middle where it is heated and the work embedded.

To locate the heat produced by the current passing through the low conducting material more particularly at the center of the box and not at its ends, without making the surface of the yielding material lower in the middle, I form a box, as shown in Fig. 3, with ends of much greater cross-section than the middle.

In Fig. 4 the apparatus described is arranged and supported between a stationary and a movable clamp similar to those usually employed in electric welding to hold the bars to be welded to illustrate that bars or blanks can be held in a suitable position to be welded or worked while heated by my method, and after they are sufficiently heated or softened they can be welded or worked in any desired manner before being removed from the box. The figure shows bars E E, held by clamps F and F', with their ends in contact and embedded in the yielding material A and in position to be welded. After said bars are softened sufficiently the weld may be effected by moving clamp F', by means of the screw G, toward the other clamp, after which the bars may be removed.

It will be obvious that should it be necessary to cool the work more or less before removing it from the apparatus it may be done by discontinuing the current. With this apparatus bars of very different conductivity and cross-section can be united with ease and without burning the smaller bar, as the larger one may be exposed or embedded a longer time than the smaller one.

In the last figure the plates C C lie flat upon the bottom of the box and the yielding material is piled up in the center of the box, leaving the ends uncovered to permit the bars to be passed through easily.

In order to increase the resistance of the yielding material at the joint, a block of non-conducting material, as fire-brick, may be placed between the plates upon the bottom of the box, as shown in dotted lines in the figure.

For the purpose of restoring or retaining the heat a cover of non-heat-conducting material may be placed over the box B, as also shown in dotted lines in Fig. 4.

It will be obvious that the yielding bed may be of any suitable material that will give the desired resistance to the current and in which material to be worked can be embedded and may be a liquid, as oil or a metallic liquid.

Having described my invention, what I claim is—

1. The herein-described method for electrically heating bars or blanks for welding and working purposes, consisting in embedding the bars or blanks in a yielding bed of conducting material, passing a heavy electric current through said bed to heat the same, and then applying a force to weld or shape the said bars or blanks while heated.

2. The herein-described method for electrically heating bars or blanks for welding and working purposes, consisting in passing an electric heating-current through a yielding bed of conducting material, then embedding the bars or blanks therein to heat or soften them, and then applying a suitable force to weld or shape the said bars or blanks while in a softened condition.

3. The herein-described method for electrically heating bars or blanks for welding and working purposes, consisting in embedding the bars or blanks in a yielding bed of low conducting material located between electric terminals and supported upon non-conducting material, passing an electric current through said bed between the terminals to heat or soften the bars or blanks embedded therein, and then applying a suitable force to weld or shape the bars or blanks, as desired.

4. The herein-described method for electrically heating bars or blanks for welding and working purposes, consisting in embedding the bars or blanks in a suitable position in a yielding bed of low conducting material located between electric terminals, passing an electric current through said bed between the terminals to heat or soften the bars or blanks embedded therein, and then applying a suitable force to perform the operation desired upon the bars or blanks while in position.

5. The herein-described method for electrically heating bars or blanks for welding and working purposes, consisting in embedding the bars or blanks in a bed of powdered or granulated conducting material located between electric terminals, passing an electric current through said bed to heat the same and the bars or blanks, and then applying a suitable force to perform the operation desired upon the bars or blanks while in position.

6. The herein-described method of electrically heating bars or blanks for welding and working purposes, consisting in embedding a portion of a bar or blank in a yielding bed of conducting material located between electric terminals while the other portion is not embedded, and passing an electric current through said bed to heat the same and the portion of the bar or blank embedded.

7. The herein-described method for electrically heating bars or blanks for welding and working purposes, consisting in passing an electric current through a yielding bed of powdered or granulated semi-conducting material located between electric terminals, then embedding the bars or blanks therein until sufficiently heated, and removing them without interrupting the current through the bed.

8. The herein-described method for electrically heating bars or blanks for welding and working purposes, consisting in embedding the bars or blanks in a yielding bed of conducting material, shaping said bed to create a uniform resistance to the current, supporting the bed in a non-conducting receptacle, and passing a heavy electric current through said bed to heat the same.

9. The herein-described method for electrically heating bars or blanks for welding and working purposes, consisting in first passing an electric current through a yielding bed of conducting material until it is heated and then embedding the work in said bed until it has reached the desired temperature.

In testimony whereof I have hereunto signed my name this 6th day of June, 1890.

MARK W. DEWEY. [L. S.]

Witnesses:
C. H. DUELL,
J. J. LAASS.

Corrections in Letters Patent No. 436,519.

It is hereby certified that in Letters Patent No. 436,519, granted September 16, 1890, upon the application of Mark W. Dewey, of Syracuse, New York, for an improvement in the "Method of Electrically Heating Bars, &c., for Welding and Working Purposes," errors appear in the printed specification requiring correction, as follows: In line 95, page 2, the words "a uniform" should read *an ununiform,* and a comma should be inserted after the word "current"; and that the Letters Patent should be read with these corrections therein that the same may conform to the record of the case in the Patent Office.

Signed, countersigned and sealed this 30th day of September, A. D. 1890.

[SEAL.]

CYRUS BUSSEY,
*Assistant Secretary of the Interior.*

Countersigned:
C. E. MITCHELL,
*Commissioner of Patents.*